United States Patent
Kito et al.

(10) Patent No.: US 11,469,832 B2
(45) Date of Patent: Oct. 11, 2022

(54) CONTROL STATION DEVICE AND ALARM ISSUE METHOD FOR CONTROL STATION DEVICE

(71) Applicant: HITACHI KOKUSAI ELECTRIC INC., Tokyo (JP)

(72) Inventors: Ryota Kito, Kodaira (JP); Yasuhiko Suzuki, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 113 days.

(21) Appl. No.: 16/977,791

(22) PCT Filed: Mar. 19, 2018

(86) PCT No.: PCT/JP2018/010776
§ 371 (c)(1),
(2) Date: Sep. 2, 2020

(87) PCT Pub. No.: WO2019/180771
PCT Pub. Date: Sep. 26, 2019

(65) Prior Publication Data
US 2020/0403715 A1  Dec. 24, 2020

(51) Int. Cl.
*H04B 17/23* (2015.01)
*H04B 7/185* (2006.01)

(52) U.S. Cl.
CPC ......... *H04B 17/23* (2015.01); *H04B 7/18506* (2013.01)

(58) Field of Classification Search
CPC ... H04W 24/08; H04B 17/23; H04B 7/18506; G08G 5/0082; G08G 5/0004
See application file for complete search history.

(56) References Cited

U.S. PATENT DOCUMENTS

| 8,385,449 B2 | 2/2013 | Lipp | |
| 2006/0205345 A1* | 9/2006 | Ishikawa | H04B 7/18506 455/12.1 |
| 2016/0149737 A1* | 5/2016 | Detert | H04L 27/06 375/224 |

FOREIGN PATENT DOCUMENTS

| JP | 11-160422 A | 6/1999 |
| JP | 2006-238061 A | 9/2006 |

OTHER PUBLICATIONS

International Search Report of PCT/JP2018/010776 dated Jun. 26, 2020.

* cited by examiner

*Primary Examiner* — Rahel Guarino
(74) *Attorney, Agent, or Firm* — Mattingly & Malur, PC

(57) ABSTRACT

A control station device includes a wireless machine having an interference determination unit that uses one or multiple methods for a received signal to determine in real time whether interference has occurred, a multi-wave simultaneous reception start determination unit that causes received interfering waveform information to be held in a memory and determines whether a plurality of signals have been simultaneously terminated, and an alarm display unit that issues a first alarm indicating an interference state and a second alarm indicating termination of simultaneous transmission based on information from the interference determination unit and information from the multi-wave simultaneous reception start determination unit.

4 Claims, 13 Drawing Sheets

CONTROL STATION DEVICE AND ALARM ISSUE METHOD FOR CONTROL STATION DEVICE

TECHNICAL FIELD

The present disclosure relates to a control station device and is applicable to, for example, a control station device that performs interference detection.

BACKGROUND ART

In wireless communication of air traffic control, troubles caused by interference have been frequently reported. When a plurality of wireless stations simultaneously transmit radio waves at the same frequency, interference occurs on a receiving side. Traditionally, whether interference has occurred is determined by human ears. In a wireless communication method for air traffic control, AM modulation is used and audio overlapping and abnormal noise occur on the receiving side in an interference state. Therefore, a person identifies whether interference has occurred based on the audio overlapping and the abnormal noise and prevents a serious accident.

CITATION LIST

Patent Literature

PTL 1: U.S. Pat. No. 8,385,449
PTL 2: U.S. Patent Application Publication No. 2016/0149737
PTL 3: Japanese Patent Application Laid-Open No. Hei 11-160422

SUMMARY OF INVENTION

Technical Problem

However, when a difference between reception levels of a plurality of received radio waves is, for example, 20 dB or more, effects of audio overlapping and abnormal noise that are caused by interference are significantly small and thus it is almost impossible for human ears to identify whether interference has occurred. In addition, since determination is made only by a sense of hearing in a traditional method for detecting interference, the detection may be overlooked.

Other challenges and new characteristics will be clarified from the description of the present specification and the accompanying drawings.

Solution to Problem

A representative overview of the present disclosure is briefly described below.

Specifically, a control station device includes a wireless machine having an interference determination unit that uses one or multiple methods for a received signal to determine in real time whether interference has occurred, a multi-wave simultaneous reception start determination unit that causes received interfering waveform information to be held in a memory and determines whether a plurality of signals have been simultaneously terminated, and an alarm display unit that issues a first alarm indicating an interference state and a second alarm indicating termination of simultaneous transmission based on information from the interference determination unit and information from the multi-wave simultaneous reception start determination unit.

Advantageous Effects of Invention

According to the foregoing control station device, it is possible to improve the reliability of interference detection.

DESCRIPTION OF EMBODIMENT

Hereinafter, an embodiment is described using the drawings. However, in the following description, the same constituent elements are indicated by the same reference signs, and a repetitive description is omitted in some cases.

Figure 1:
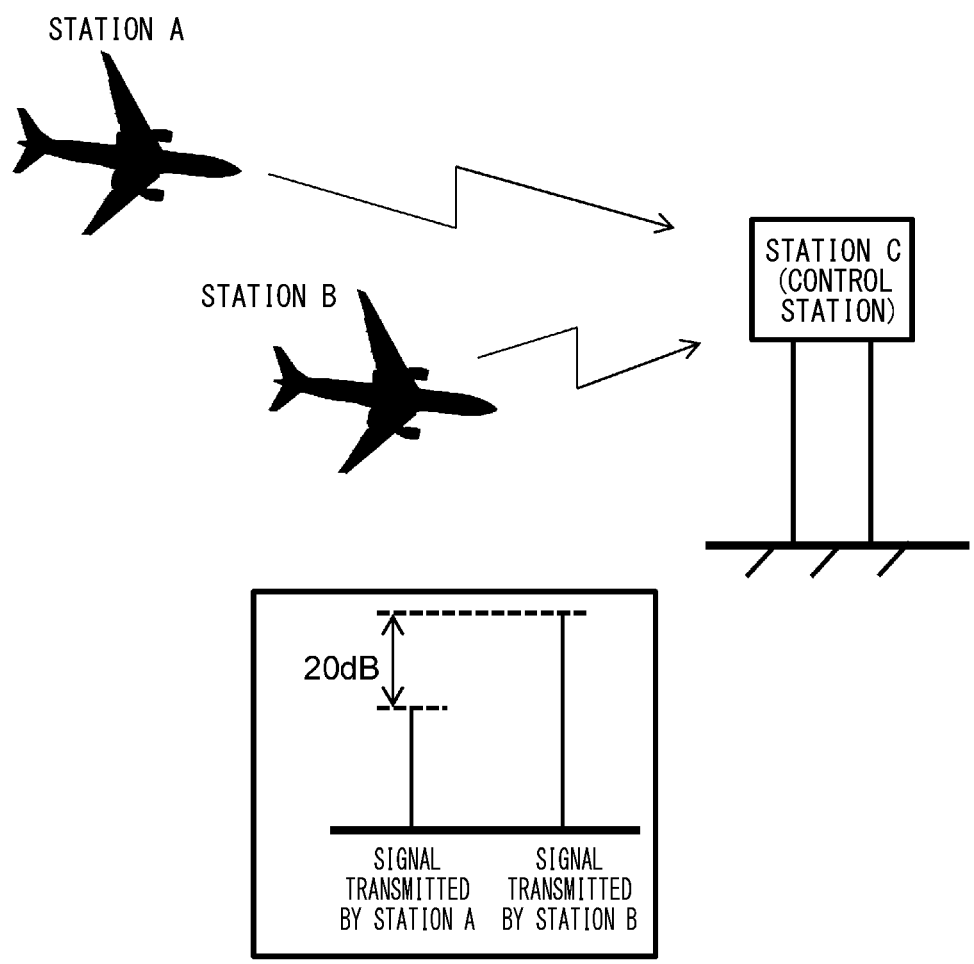
FIG. 1 is a schematic diagram of an air traffic control system.

FIG. 1 is a schematic diagram of an air traffic control system. The air traffic control system includes a station A, a station B, and a station C. The stations A and B are airplanes, while the station C is a control station. It is assumed that the station A and the station B simultaneously start transmission, the station C performs reception, and the level of a signal transmitted by the station B and received is higher by 20 dB than the level of a signal transmitted by the station A and received. The station C receives the signal transmitted by the station B and having the higher transmission level, and it is difficult for a sense of hearing to confirm the signal of the station A that has simultaneously started the transmission.

In this case, an interference determination unit described later compares interference when signals of two or more waves are simultaneously received with a state without interference, performs detection, issues an alarm in real time, and can prevent beat detection from being overlooked.

Figure 2:
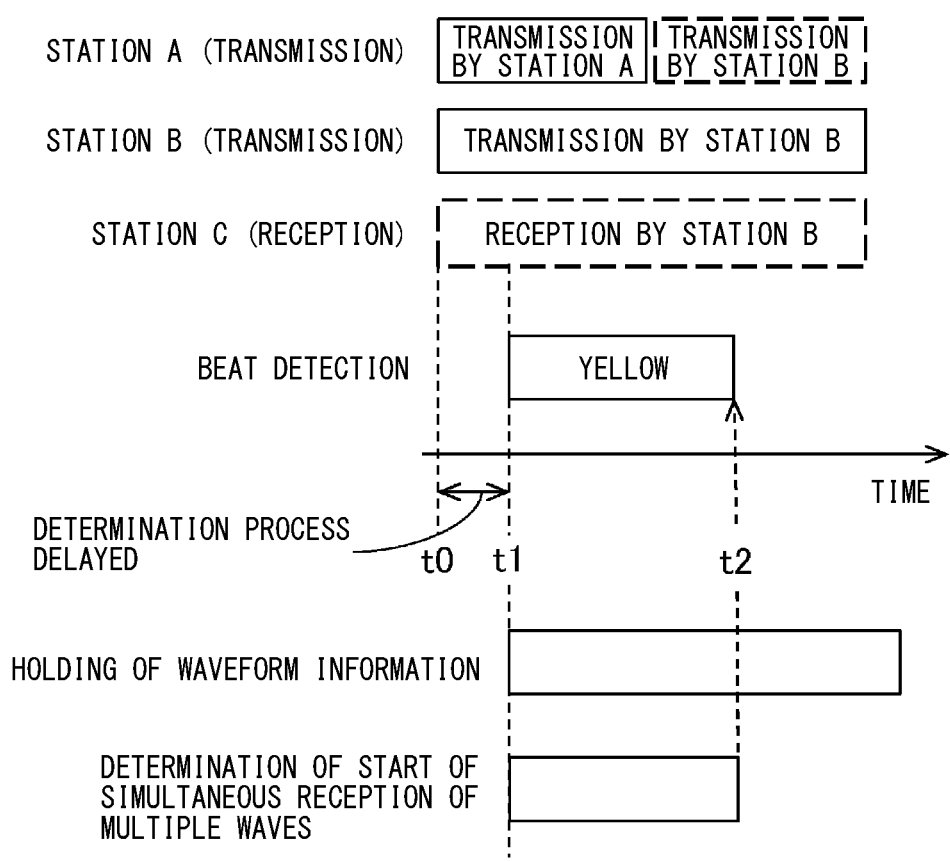
FIG. 2 is a diagram illustrating the case where times when a station A and a station B start transmission are the same and times when the station A and the station B terminates the transmission are different.
Figure 3:
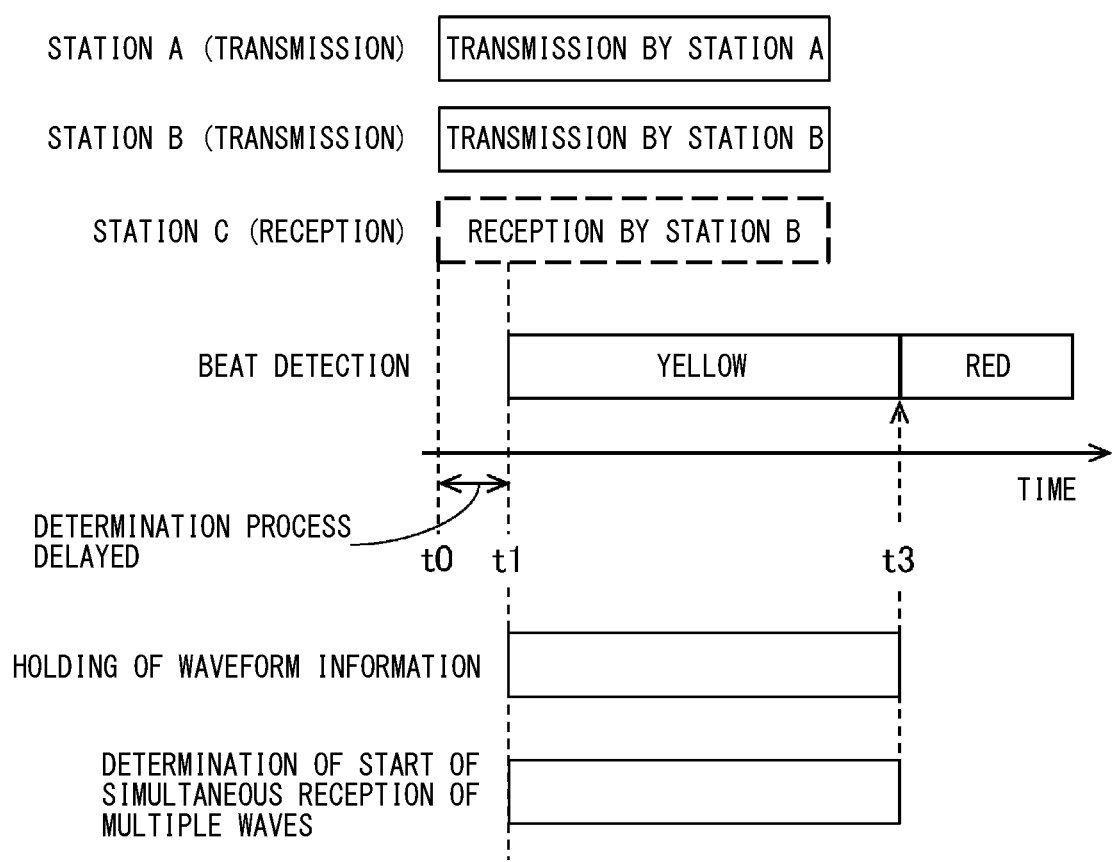
FIG. 3 is a diagram illustrating the case where times when the station A and the station B start transmission are the same and times when the station A and the station B terminates the transmission are the same.

Next, the interference of the signal transmitted by the station A with the signal transmitted by the station B is described using FIGS. 2 and 3. FIG. 2 is a diagram describing the case where times when the station A and the station B start the transmission are the same and times when the station A and the station B terminate the transmission are different. FIG. 3 is a diagram describing the case where times when the station A and the station B start transmission are the same and times when the station A and the station B terminate the transmission are the same.

In the case illustrated in FIG. 2, the station B does not receive audio of the station A and thus does not detect beat, and the station C does not detect the beat even when the station A terminates the transmission, since the level of the station B is higher by 20 dB than that of the station A. However, since the signal transmitted by the station B is received by the station A when the station A terminates the transmission, the station A can confirm that the signal transmitted by the station A does not reach the station C. Therefore, the station A can perform communication again and prevent an accident.

However, in the case illustrated in FIG. 3, the station B does not receive audio of the station A and thus does not detect beat, and the station C does not detect the beat even when the station A terminates the transmission, since the level of the station B is higher by 20 dB than that of the station A. In addition, since the station A and the station B simultaneously terminate the transmission, the station A cannot confirm, by a sense of hearing, that the signal transmitted by the station A does not reach the station C, no wireless station detects the beat, only a beat detection system by the foregoing interference determination unit is reliable, and the beat detection is not reliable.

Figure 4:
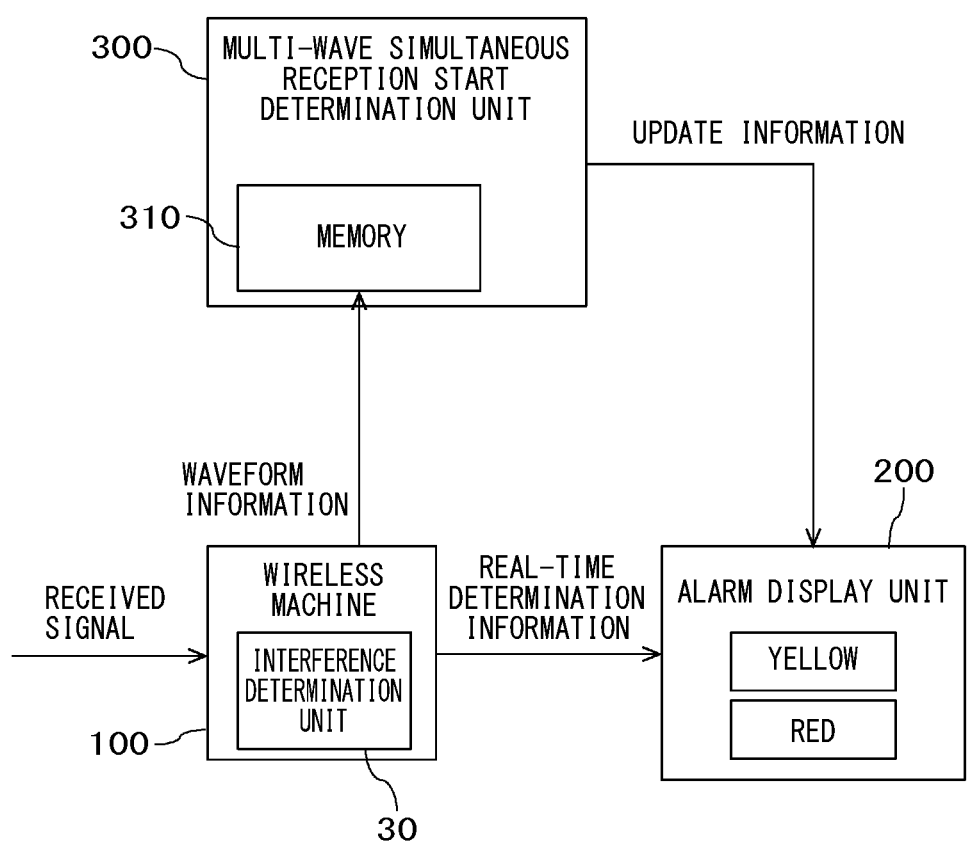
FIG. 4 is a block diagram of a control station device.

Next, a control station device according to the embodiment is described using FIG. 4. FIG. 4 is a block diagram of the control station device.

The control station device of the station C includes a wireless machine 100, an alarm display unit 200, and a multi-wave simultaneous reception start determination unit 300.

Upon simultaneously receiving two or more waves, the wireless machine 100 causes the interference determination unit 30 to determine interference in a determination process time period (of approximately 20 ms) from a start time t0 of the simultaneous reception to a time t1. Then, the wireless machine 100 transmits information of the determination to the alarm display unit 200 in real time and causes the alarm display unit 200 to issue a yellow alarm.

As illustrated in FIG. 2, when one (station A) of the stations terminates the transmission, and the other (station B) of the stations continues the transmission, the waveform of the received signal is different from that of the interfering signal. Thus, the interference determination unit 30 does not determine the received signal as the interference, and the alarm display unit 200 that has received information of the determination stops issuing the yellow alarm at a time t2. The multi-wave simultaneous reception start determination unit 300 cancels simultaneous reception determination. The wireless machine 100 does not detect interference at the time t2, but continuously detects the transmitted signal. Until the transmitted signal is no longer detected, a memory 310 continuously holds waveform information. Therefore, although the transmission is simultaneously started, the multi-wave simultaneous reception start determination unit 300 can recognize that the one of the stations has terminated the transmission.

In the case where the transmission is simultaneously terminated as illustrated in FIG. 3, at a termination time t3 of the simultaneous transmission, the multi-wave simultaneous reception start determination unit 300 outputs, based on the waveform information of an interference state that is held in the memory 310, update information indicating that the detection of the transmitted signals has been simultaneously stopped. When the detection of the interference state and the detection of the transmitted signals are simultaneously stopped due to the update information of the multi-wave simultaneous reception start determination unit 300, the alarm display unit 200 provides a flag indicating that the transmission of the multiple received waves has been simultaneously stopped, and the alarm display unit 200 issues a red alarm after canceling the yellow alarm.

The alarm display unit 200 issues the yellow alarm or the red alarm based on the real-time determination information from the interference determination unit 30 and the update information of the multi-wave simultaneous reception start determination unit 300, depending on a state in which the transmission of the signals of the two waves is simultaneously started and a state in which the transmission of the signals of the two waves is simultaneously terminated.

The multi-wave simultaneous reception start determination unit 300 includes the memory 310 for holding received waveform information and determines the start of simultaneous reception of multiple waves on the assumption that the transmission is simultaneously started and simultaneously terminated. When the alarm display unit 200 detects the start of the transmission of two waves and issues the yellow alarm indicating the "interference state", the transmission of one of the two waves is terminated, and the termination of interference is not detected, the alarm display unit 200 identifies the "termination of the simultaneous transmission of the two waves" and issues the red alarm.

By using the yellow alarm indicating this "interference state" and the red alarm indicating the "termination of the simultaneous transmission of the two waves (multiple waves)", the multiple signals that have been started being simultaneously transmitted and stopped being simultaneously transmitted can be detected.

Figure 5:
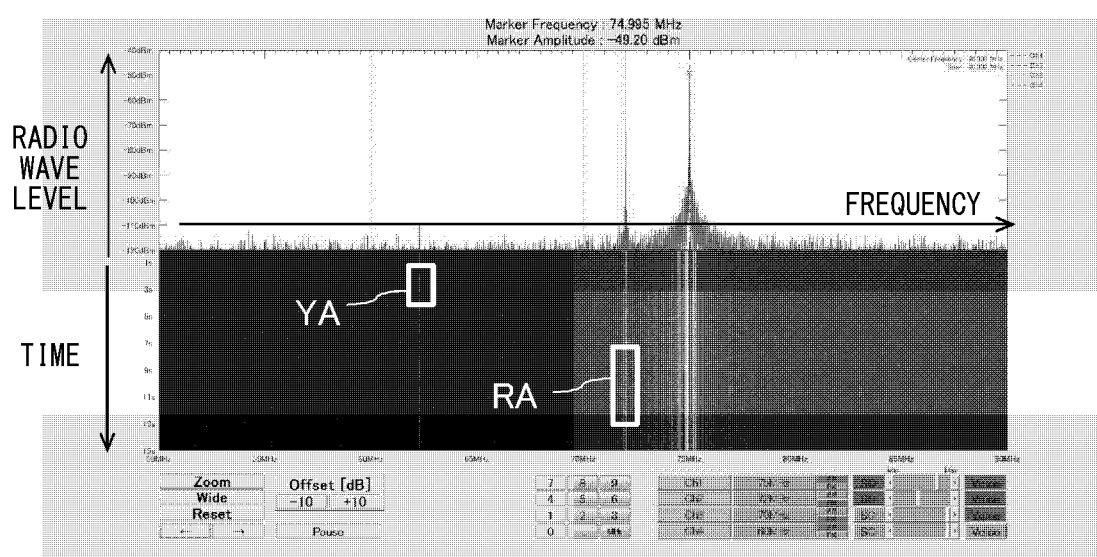
FIG. 5 is a diagram illustrating a display example of yellow and red alarms of an alarm display unit.

FIG. 5 is a diagram illustrating a display example of the yellow and red alarms of the alarm display unit. The alarms are displayed with three axes, a frequency axis (abscissa), a time axis (lower ordinate), and a radio wave level (upper ordinate). On the time axis side, levels of radio waves are displayed in color. The yellow alarm YA and the red alarm RA are displayed on the time axis.

In FIG. 5, the yellow alarm YA is displayed in yellow during a time period from 1 second to 4 seconds on the time axis. When beat corresponding to the red alarm occurs during a time period from a time before 7 seconds to a time before 13 seconds, the red alarm RA is displayed in red on the time axis during a time period from 7 seconds to 13 seconds.

Figure 6:
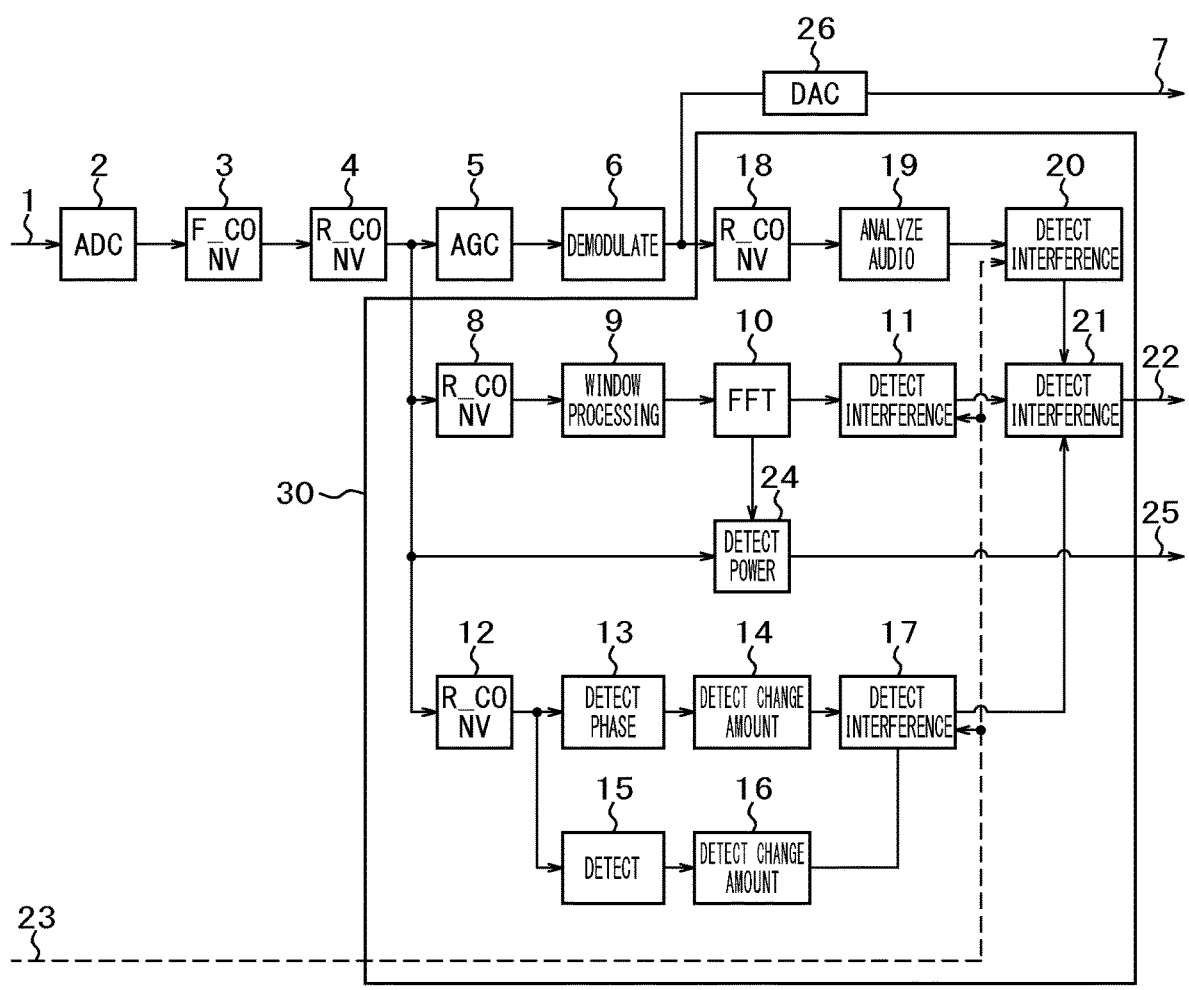
FIG. 6 is a system diagram of a digital processing circuit of a wireless machine illustrated in FIG. 4.
Figure 7:
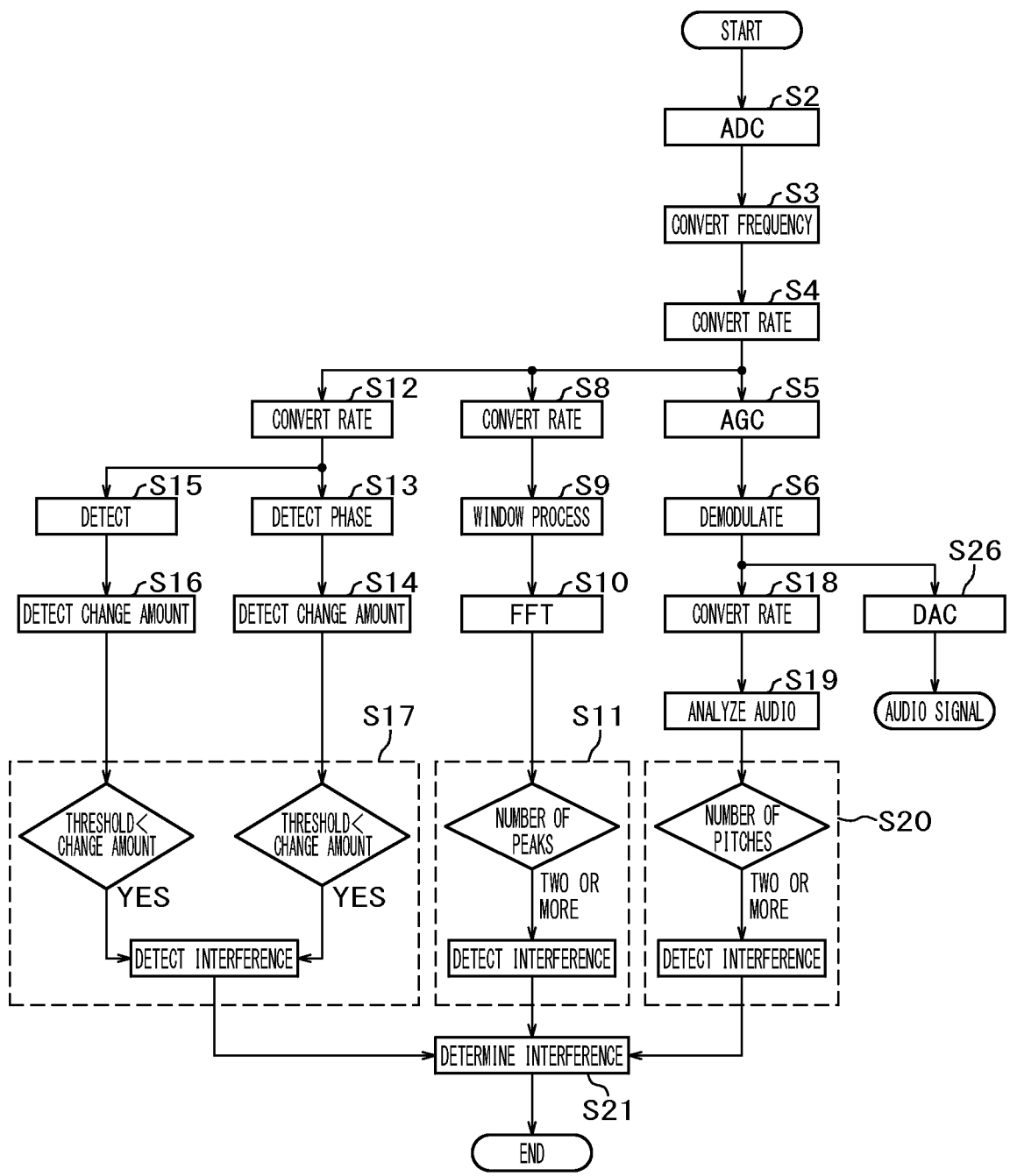
FIG. 7 is a process flow diagram illustrating operations of the digital processing circuit illustrated in FIG. 6.

Next, the wireless machine is described using FIGS. 6 to 13. FIG. 6 is a system diagram of a digital processing circuit of the wireless machine illustrated in FIG. 4. FIG. 7 is a flow diagram illustrating operations of the digital processing circuit illustrated in FIG. 6.

A receiver of the wireless machine 100 includes an analog-to-digital converter (ADC) 2 to which an analog signal 1 is input, a frequency converter (F_CONV) 3, a first rate converter (R_CONV) 4, an automatic gain control (AGC) unit 5, a demodulator 6, a digital-to-analog converter (DAC) 26 that outputs an audio signal 7, and an interference determination unit 30.

The interference determination unit 30 includes a second rate converter 8 to which a signal from the first rate converter 4 is input, a window function unit 9, a fast Fourier transform (FFT) unit 10, and a first interference detector 11.

The interference determination unit 30 further includes a third rate converter 12 to which a signal from the first rate converter 4 is input, a phase detector 13, a first change amount calculator 14, a detector 15, a second change amount calculator 16, and a second interference detector 17.

The interference determination unit 30 further includes a fourth rate converter 18, an audio analyzer 19, and a third interference detector 20.

The interference determination unit 30 further includes an interference determination unit 21 to which interference determination results of the first interference detector 11, the second interference detector 17, and the third interference detector 20 are input.

The interference determination unit 30 further includes a power detector 24 to which signals output from the FFT unit 10 and the first rate converter 4 are input.

The audio signal 7, an interference determination result output signal 22, and interference level output are included in the real-time determination information illustrated in FIG. 4.

Next, operations of the receiver of the wireless machine 100 are described. Step numbers (numbers after "S") illustrated in FIG. 7 correspond to the numbers of the reference signs of the constituent elements illustrated in FIG. 6.

Step S2: The ADC 2 converts the analog signal 1 of an IF frequency or the orthogonalized analog signal 1 of a baseband frequency into a digital signal.

Step S3: The frequency converter 3 converts the digital signal output from the ADC 2 from the IF frequency to a baseband frequency. However, in the case where the orthogonalized analog signal of the baseband frequency is converted into the digital signal by the ADC 2, the frequency converter 3 (step S3) can be omitted.

Step S4: The first rate converter (R_CONV) 4 converts the signal output by the frequency converter 3 into a sampling rate optimal for a demodulation process.

Step S5: The AGC unit 5 amplifies or attenuates the amplitude of the signal output from the first rate converter 4 to a level optimal for AM demodulation.

Step S5: The demodulator 6 demodulates the signal output by the AGC unit 5 to an audio signal.

Step 26: The DAC 26 converts the digital signal that is the output result of the demodulation into the audio signal 7 that is an analog signal.

The foregoing operations are normal operations of the receiver. Next, a first interference detection operation is described.

Step S8: The second rate converter 8 further performs rate conversion on the signal output by the first rate converter 4.

Step S9: The window function unit 9 performs a window process on the signal output by the second rate converter 8 in order to optimize an FFT result of a next process.

Step S10: The FFT unit 10 converts the signal output by the window function unit 9 into a relationship between a frequency and a level.

Step S11: The first interference detector 11 detects peak power of a carrier output by the FFT unit 10 and determines the interference state based on the number of detected peaks.

When the size of FFT is fixed, frequency resolution of the FFT can be improved by reducing a sampling frequency of the received signal to a frequency lower than a band necessary for demodulation. This is determined based on a frequency deviation of a transmitter. For the frequency resolution of the FFT, the sampling frequency is adjusted to the extent that fluctuation of a transmission frequency of the wireless machine can be identified, and the relationship between the frequency and the reception level is calculated by performing an FFT process. The number of peak power levels that are carrier components of a modulated signal is detected from FFT output. When the number of peak power levels that are equal to or larger than a fixed threshold is 2 or more, interference is determined as having occurred. In this process, since a small increase in a level of a noise floor and a small decrease in the level of the noise floor are not detected as peak power, the threshold is set so that only peak power with a certain level and greater is detected. This threshold can be arbitrarily set and changed by an external signal 23 based on a reception state (radio wave state) of a radio wave.

Figure 8:
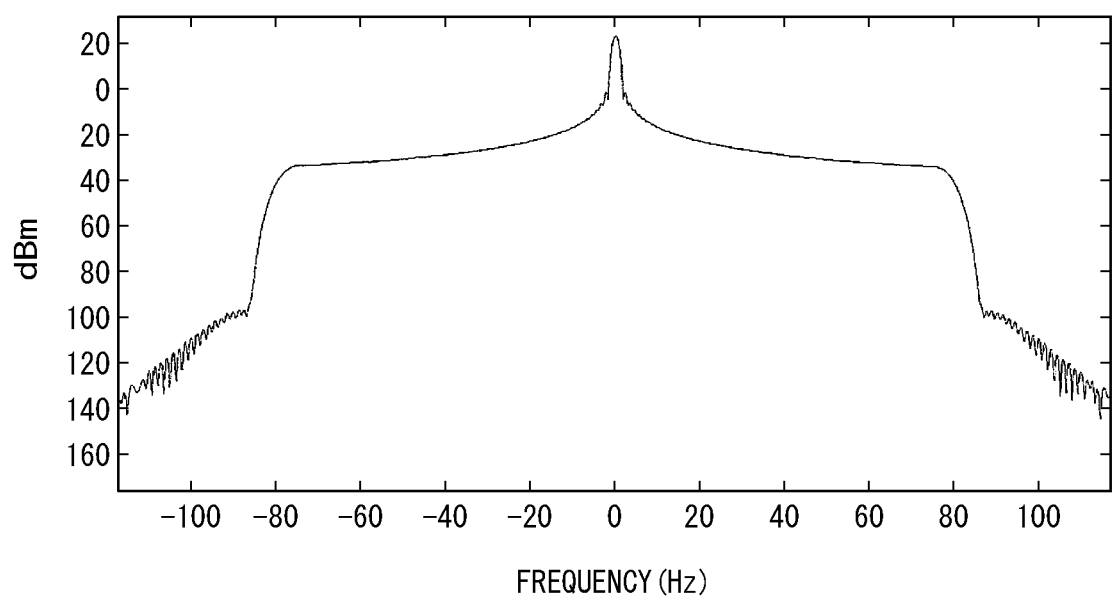
FIG. 8 is a simulation waveform diagram of a spectrum when interference does not occur.
Figure 9:
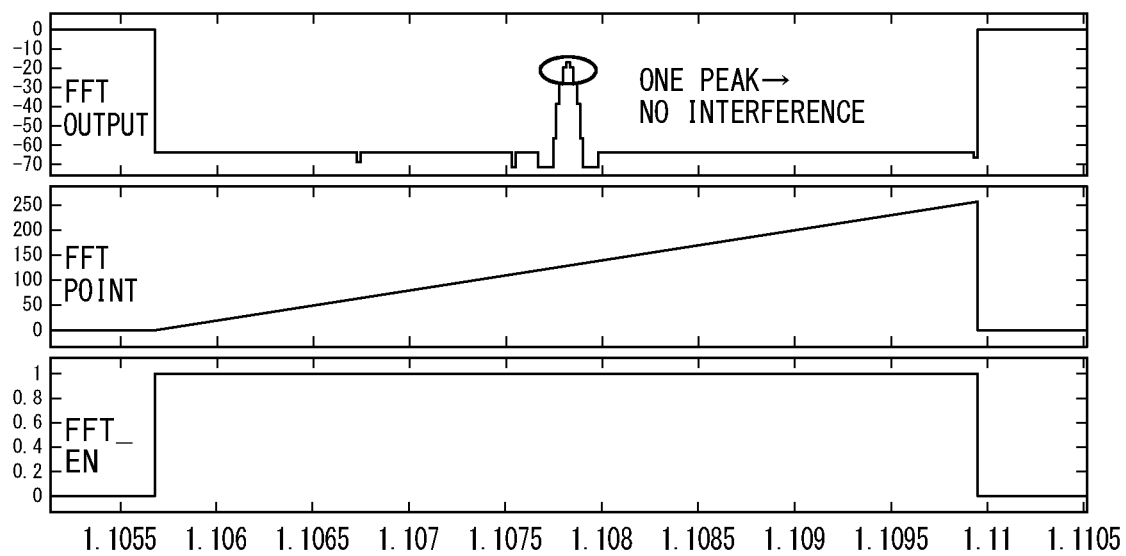
FIG. 9 is a simulation waveform diagram of signals when interference does not occur.

FIG. 8 is a simulation waveform diagram of a spectrum that is obtained by enlarging and displaying a carrier signal of an AM modulated wave when interference does not occur. FIG. 9 is a simulation waveform diagram of FFT when interference does not occur. By reducing the sampling frequency to several hundreds of hertz, only the carrier signal of the AM modulated wave can be extracted. The number of peak outputs of the carrier signal is 1.

Figure 10:
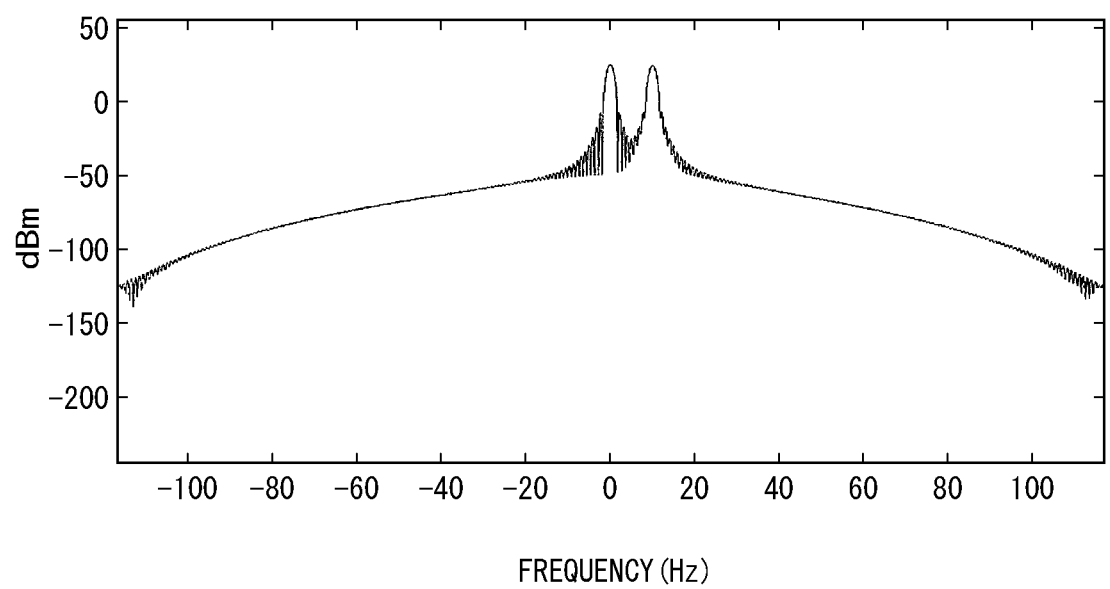
FIG. 10 is a simulation waveform diagram of a spectrum when interference occurs.
Figure 11:
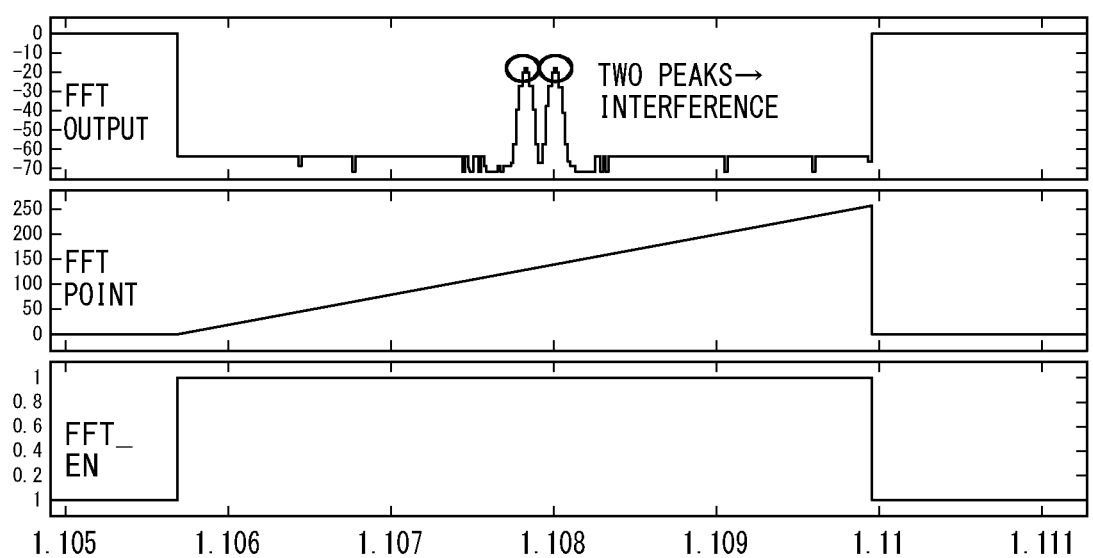
FIG. 11 is a simulation waveform diagram of signals when interference occurs.

FIG. 10 is a simulation waveform diagram of a spectrum that is obtained by enlarging and displaying a carrier signal of an AM modulated wave when interference occurs. FIG. 11 is a simulation waveform diagram of FFT when interference occurs. In the case where interference occurs, even when a transmitting side performs transmission at the same frequency, a receiving side can confirm a plurality of carrier signals of AM modulated waves due to fluctuation of source oscillation and Doppler shift. In this process, when peak power of a carrier signal is detected and the number of peak power levels higher than the fixed threshold is 2 or more, interference is determined as having been detected. However, when carrier frequencies of the AM modulated waves are very close to each other, the carrier signals of the AM modulated waves overlap each other on the frequency axis and thus detection of peak power levels may be overlooked.

Next, a second interference detection operation is described.

Step S12: The third rate converter 12 further performs rate conversion on the signal output by the first rate converter 4.

Step S13: The phase detector 13 calculates the phase of the signal output by the third converter 12.

Step S14: The first change amount calculator 14 calculates the amount of a change in the signal output by the phase detector 13.

Step S15: The detector 15 calculates power of the signal output by the third rate converter 12.

Step S16: The second change amount calculator 16 calculates the amount of a change in the signal output by the detector 15.

Step S17: The second interference detector 17 comprehensively determines the interference state based on results of detecting the change amounts by the first change amount calculator 14 and the second change amount calculator 16.

The second interference detector 17 adjusts the sampling frequency of the received signal in the same manner as the first interference detection operation and calculates either or both of the phase and power of the carrier. In addition, the second interference detector 17 calculates amounts of changes in the calculated phase and power of the carrier. When interference occurs, peak values of the calculated change amounts are larger than those when interference does not occur. Therefore, interference is determined as having occurred when the peak values exceed fixed thresholds. Due to a level difference between the plurality of input received signals and a phase difference between the plurality of input received signals, amounts of changes when interference occurs and when interference does not occur may be small. It is, therefore, desirable that both of the power and the phase be detected. The thresholds may be arbitrarily set and changed by the external signal 23 based on reception states of the radio waves.

Figure 12:
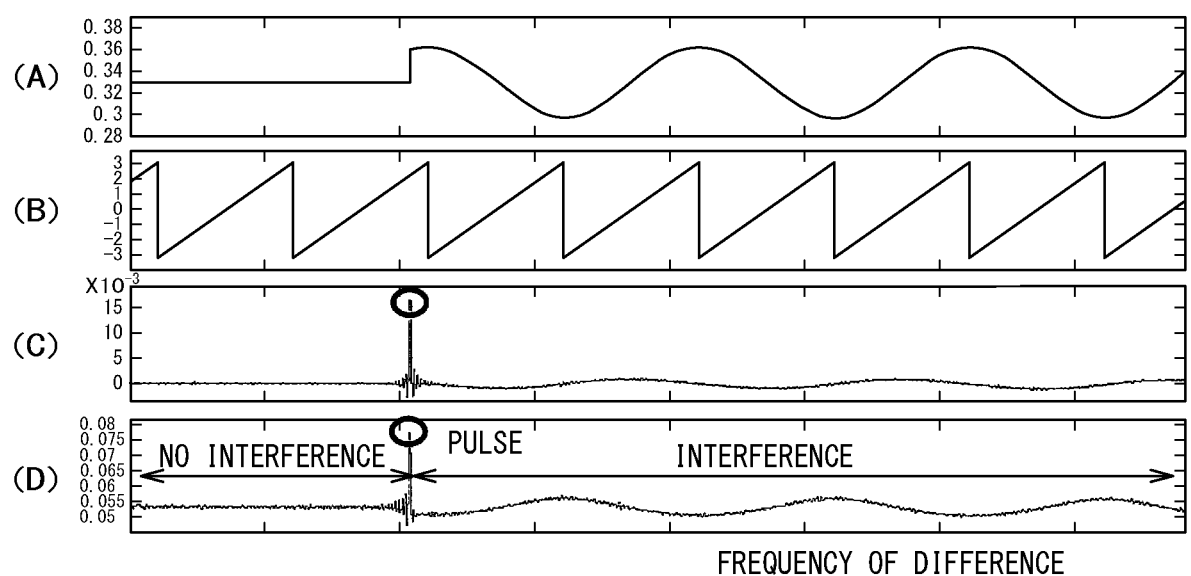
FIG. 12 is a diagram illustrating a phase, power, and amounts of changes in the phase and the power when interference occurs and when interference does not occur.

FIG. 12 is a diagram illustrating the amount (A) of received power and a phase (B) when interference occurs and when interference does not occur, the amount (C) of a change in the received power, and the amount (D) of a change in the phase. The second interference detector 17 reduces the sampling frequency to the order of several hundreds of hertz and extracts only the carrier signals of the AM modulated waves. In the case where carrier frequencies of the plurality of AM modulated waves are equal to or lower than 1 Hz and close to each other, as indicated by circles in the drawing, after a pulse of the amount of the change in the reception power and a pulse of the amount of the change in the phase occur, difference frequencies appear in a signal of the amount of the change in the reception power and a signal of the amount of the change in the phase. When the change amounts (variations) of the signals are larger than the fixed thresholds, the change amounts are notified as detected interference to an interference detection block.

Next, a third interference detection operation is described.

Step S18: The fourth rate converter 18 further performs rate conversion on the demodulation result output by the demodulator 6.

Step S19: The audio analyzer 19 performs audio analysis on the signal output by the fourth rate converter 18.

Step S20: The third interference detector 20 detects, from an audio analysis result output by the audio analyzer 19, whether interference has occurred.

The third interference detector 20 adjusts the sampling frequency of the demodulation result output from the demodulator 6, performs the audio analysis, and detects whether multiple speaking persons exist, thereby detecting whether the interference has occurred. For the audio analysis, there are various methods, such as a waveform process, a correlation process, and a spectrum process, but an optimal method is determined based on the configuration of the wireless machine and a purpose of use. For example, whether multiple speaking persons exist or whether the interference state has occurred can be detected by a peak extraction method from audio based on how a peak included in output of autocorrelation rises in a specific interval of the audio.

In addition, as a different method for the audio analysis, multiple matched filters with audio pitches different for all call signs are held inside for audio communication in which the call signs and a phonetic code that have been determined in air traffic control are used, a convolution operation is performed with a demodulated audio signal, correlation peaks of multiple call signs rise at the time of interference, and whether interference has occurred can be determined by detecting the correlation peaks. Algorithms for the detection and the determination can be set and changed by the external signal 23.

Figure 13:
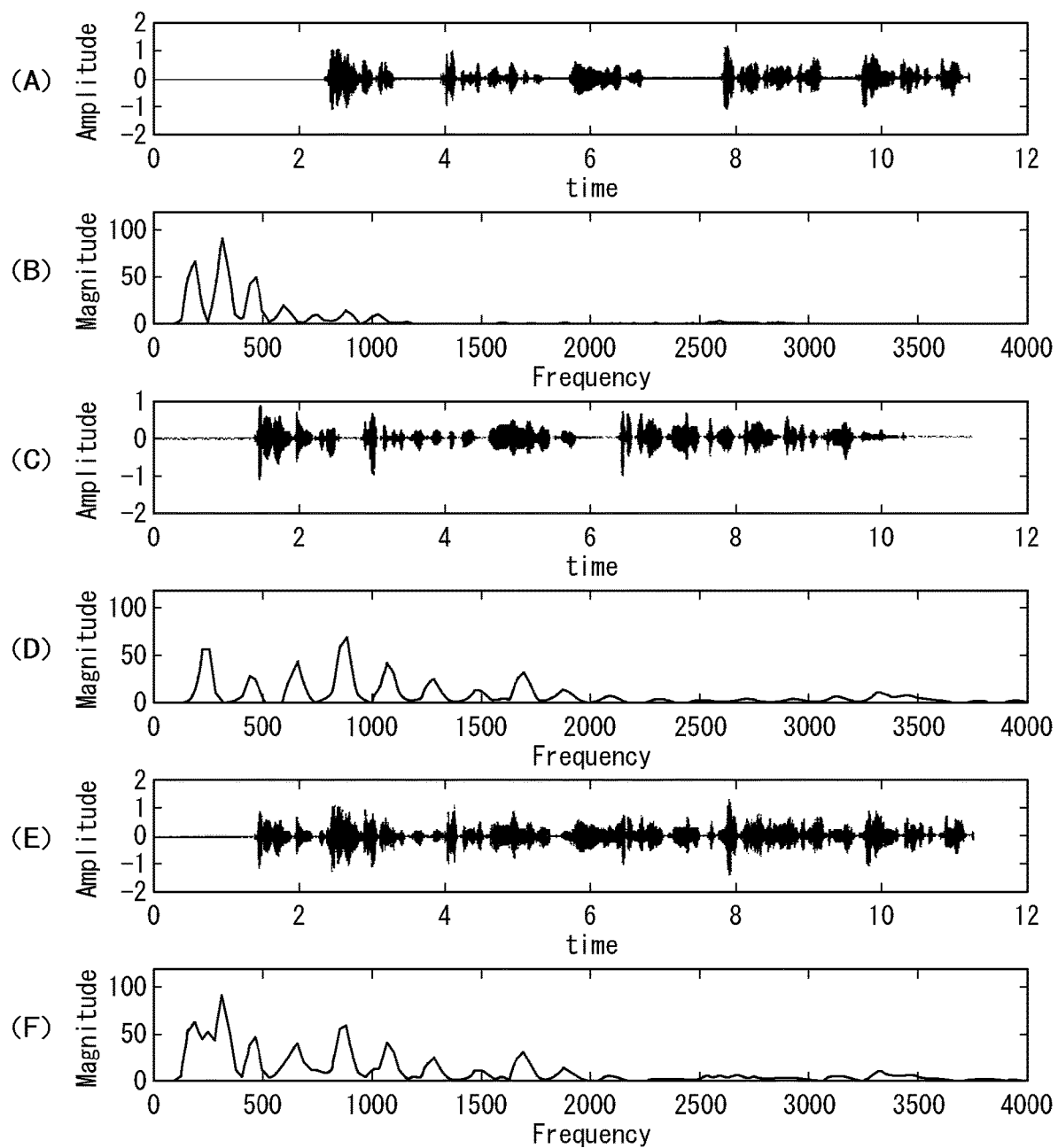
FIG. 13 is a diagram of audio waveforms extracted at pitches when interference occurs and when interference does not occur.

FIG. 13 is a waveform diagram illustrating an audio signal (A) of a speaking person A, a spectrum (B) of a short-interval audio signal of the speaking person A, an audio signal (C) of a speaking person B, a spectrum (D) of a short-interval audio signal of the speaking person B, an audio signal (E) obtained by synthesis of the speaking person A and the speaking person B, and a spectrum (F) of a short-interval audio signal of the audio signal obtained by the synthesis of the speaking person A and the speaking person B. In the audio signal spectrum (B) of the speaking person A and the audio signal spectrum (D) of the speaking person B, peak power rises at fixed intervals or fixed pitches on a frequency axis. On the other hand, in the audio signal spectrum (F) obtained by the synthesis of the speaking person A and the speaking person B, peak power rises at different pitches and a pitch shift can be confirmed due to the presence of the multiple speaking persons. Interference is detected by detecting the pitch shift and notified to the interference determination block.

Next, final determination for the interference detection by the first interference detector, the second interference detector, and the third interference detector is described.

Step S21: The interference determination unit 21 performs the final determination for the interference detection based on interference detection results of the first interference detection operation, the second interference detection operation, and the third interference detection operation and outputs a result (interference determination result output signal 22) of the determination. In the interference detection method, time intervals at which the detection results are updated, the certainty, and a detection range vary based on a difference between processing methods and a difference in throughput. For example, in a method for detecting a power peak of FFT output in the first interference detection operation, whether interference has occurred can be accurately detected by detecting a small shift between transmission frequencies of transmitters, but the detection may be overlooked when frequencies of two waves are close to each other. In addition, approximately several seconds take before the detection in a method for detecting power peaks of FFT points in the first interference detection operation, depending on a relationship between the sampling frequency and the number of FFT points. On the other hand, change amounts can be detected in the second interference detection operation. Detection results of these three methods are comprehensively identified as final interference determination output. Although the detection results of the three methods are comprehensively used and the final interference determination is performed, the interference determination may be performed using two or one of the three methods. In this case, circuits that are not used for the determination may not be provided.

When interference occurs, beat (fluctuation of a waveform) occurs, depending on a power difference between modulated waves. The power detector 24 detects a power difference between the two modulated waves from a variation in the beat and notifies the power difference as interference level output 25. Since the level of the interference can be determined based on the power difference, an operator (person) may use the power difference together with the interference determination result of step S21 for the result of the final determination. When the power difference is not used for the final determination, the power detector 24 may not be provided.

In wireless communication, a plurality of wireless stations simultaneously transmit radio waves at the same frequency and thus interference occurs on a receiving side. The wireless machine 100 uses one or multiple methods for the received radio waves to determine whether interference has occurred, and notifies it. More specifically, the wireless machine 100 executes digital processing to detect a faint received signal that cannot be identified by a human sense of hearing, determines whether interference has occurred, and notifies it. In addition, the multiple methods for detecting interference are implemented, the determination is made by comprehensively using the results, and thus the methods compensate for disadvantages of the methods to reduce erroneous detection and overlooked detection. In addition, output audio and a variation in a power level are used as factors to be used to determine whether interference has occurred.

The control station device according to the embodiment uses one or multiple methods for a received signal to determine in real time whether interference has occurred, issues the alarm, causes received interfering waveform information to be held in the memory, and issues the other alarm when multiple signals are simultaneously terminated. Therefore, the reliability of the beat detection can be improved.

Although the invention made by the present inventors is described above in detail, it goes without saying that the invention is not limited to the foregoing embodiment and can be variously changed.

For example, the embodiment describes the example in which the transmission of the two waves is simultaneously started and simultaneously terminated. The embodiment is also applicable to the case where the transmission of three or more waves is simultaneously started and simultaneously terminated.

REFERENCE SIGNS LIST

1 . . . Analog signal, 2 . . . ADC, 3 . . . Frequency converter, 4 . . . First rate converter, 5 . . . AGC unit, 6 . . . Demodulator, 7 . . . Audio signal, 8 . . . Second rate converter, 9 . . . Window function unit, 10 . . . FFT unit, 11 . . . First interference detector, 12 . . . Third rate converter, 13 . . . Phase detector, 14 . . . First change amount calculator, 15 . . . Detector, 16 . . . Second change amount calculator, 17 . . . Second interference detector, 18 . . . Fourth rate converter, 19 . . . Audio analyzer, 20 . . . Third interference detector, 21 . . . Interference determination unit, 22 . . . Interference determination result output signal, 23 . . . External signal, 24 . . . Power detector, 25 . . . Interference level output, 30 . . . Interference determination unit, 100 . . . Wireless machine, 200 . . . Alarm display unit, 300 . . . Multi-wave simultaneous reception start determination unit, 310 . . . Memory

The invention claimed is:

1. A control station device comprising:
   a wireless machine having an interference determination unit that uses one or multiple methods for a received signal to determine in real time whether interference has occurred;
   a multi-wave simultaneous reception start determination unit that causes received interfering waveform information to be held in a memory and determines whether a plurality of signals have been simultaneously terminated; and
   an alarm display unit that issues a first alarm indicating an interference state and a second alarm indicating termination of simultaneous transmission of two waves based on information from the interference determination unit and information from the multi-wave simultaneous reception start determination unit,
   wherein when the alarm display unit detects a start of the simultaneous transmission of two waves and issues the first alarm, the transmission of one of two waves is terminated, and an end of the interference is not detected, the alarm display unit identifies the termination of the simultaneous transmission of the two waves and issues the second alarm.

2. The control station device according to claim 1, wherein the alarm display unit has a frequency axis, a radio wave level axis, and a time axis and displays the first alarm and the second alarm in a quadrant defined by the frequency axis and the time axis.

3. An alarm issue method for a control station device comprising the step of:
   (a) determining in real time whether interference has occurred by using one or multiple methods for a received signal;
   (b) holding received interfering waveform information in a memory and determining whether a plurality of signals have been simultaneously terminated; and
   (c) issuing a first alarm indicating an interference state and a second alarm indicating termination of simultaneous transmission of two waves based on information determined in the step (a) and information determined in the step (b),
   wherein when the step (c) detects a start of the simultaneous transmission of two waves and issues the first alarm, the transmission of one of two waves is terminated, and an end of the interference is not detected, the alarm display unit identifies the termination of the simultaneous transmission of the two waves and issues the second alarm.

4. The alarm issue method for a control station device according to claim 3, wherein the step (c) displays the first alarm and the second alarm in a quadrant defined by a frequency axis and a time axis.

* * * * *